J. J. C. SMITH.
Manufacture of Hard-Rubber Handle for Cutlery and other Articles.

No. 219,415.                    Patented Sept. 9, 1879.

Attest.
J. Henry Kaiser.
Walter Allen.

Inventor
John J. C. Smith.
By Knight Bro.
Attys.

UNITED STATES PATENT OFFICE.

JOHN J. C. SMITH, OF SOMERVILLE, MASS., ASSIGNOR TO COLLEGE POINT RUBBER COMPANY, (LIMITED,) OF COLLEGE POINT, N. Y.

IMPROVEMENT IN THE MANUFACTURE OF HARD-RUBBER HANDLES FOR CUTLERY AND OTHER ARTICLES.

Specification forming part of Letters Patent No. 219,415, dated September 9, 1879; application filed August 8, 1878.

*To all whom it may concern:*

Be it known that I, JOHN J. C. SMITH, of Somerville, in the county of Middlesex and State of Massachusetts, have invented certain new and useful Improvements in the Manufacture of Hard-Rubber Handles for Cutlery and other Articles, of which the following is a specification.

The object of my invention is to produce handles for cutlery, tools, &c., out of hardened india-rubber, gutta-percha, or other allied gums. Such handles I form hollow, thereby saving a great deal of labor and expensive material without impairing the strength of the handle. Solid handles made of the same material are not only expensive, but certain shapes and sizes are difficult to make, which difficulty I fully overcome.

The improvement consists, further, in a method of placing a female metal screw-nut in the interior of a hollow handle as a basis to fasten the tang of a knife-blade, fork, or other tool in a cheap and substantial manner, thereby preventing a very objectional feature common to knife, fork, and other tool handles—namely, that they become loose and shaky. This I prevent by cutting a screw on the end of the tang, and then screwing it into the handle, the screw-nut fastened in the interior of the hollow handle being a firm and substantial basis to receive it. Passing a small pin vertically through the handle, nut, and tang prevents unscrewing or turning.

In order that my invention may be more fully understood, I will proceed to describe it with reference to the accompanying drawings, in which—

Figure 1:
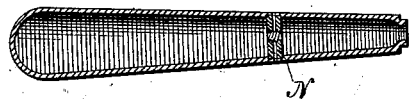
Figure 2:
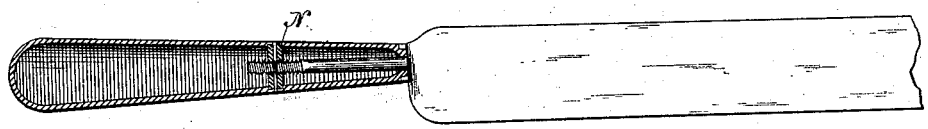
Figure 3:
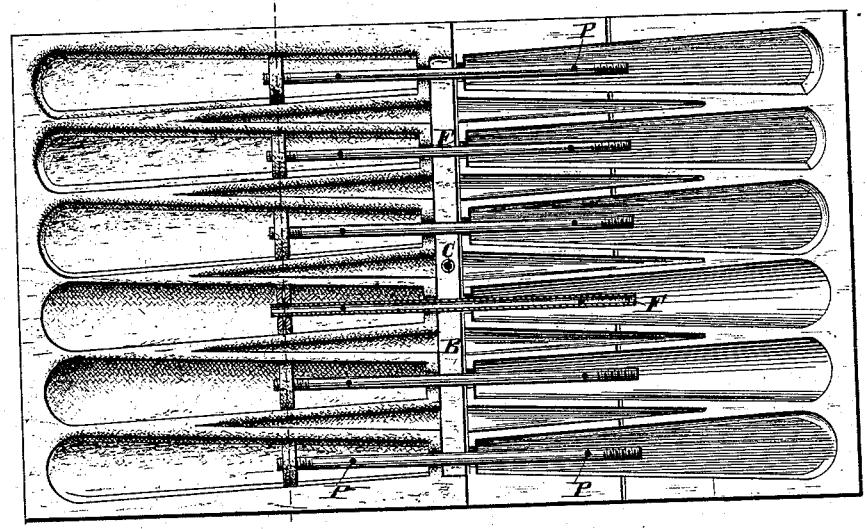
Figure 4:
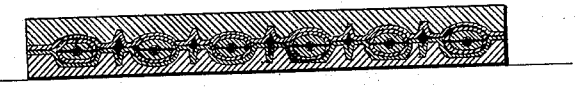

Figure 1 is a longitudinal section of a handle. Fig. 2 is a longitudinal section of a handle and knife screwed to place. Fig. 3 is a plan of a mold containing a series of single-handle molds and shapes, arranged in such a manner as to facilitate the making of hollow handles and placing the nuts in position. Fig. 4 is a cross-section of such a mold on the line 4 4, Fig. 3.

Each of the half-molds contains a series of molds or cavities for the respective handle to be made. These cavities are arranged opposite each other in such a manner that the parts which form the ends of the handles intended to receive the tangs come face to face, but are divided by the intervening channel B. This channel B has on each side smaller ones, which correspond to and make connections with the actual mold-cavities for the handles.

The channel B and its smaller side outlets, which are for the purpose of conveying water or steam, which is used as pressure medium, from one general or simple inlet, C, to the interior of each mold-cavity.

Working operation: Having provided two halves or a pair of such described molds, a sheet of raw-rubber compound corresponding in size to the surface of the mold, and of such a thickness as may be required for the thickness of the walls of the handle, is placed on each half-mold, and by manipulations of the hand or otherwise is made to conform to the shape of the cavities, care being taken not to confine any air in the cavities between the surface of the mold and rubber coming in contact therewith. When both half-molds are filled I introduce small metal tubes F, having holes P in the center and provided at each end with a screw-thread receiving a small screw-nut, N, such screw-nuts being of a size just sufficient to be placed in the cavity of the mold when charged with the rubber composition, but large enough to partly embed their edges in the rubber. The two half-molds are then closed and pressed together.

The metal tubes serve two purposes—first, by means of the holes P P P in the center, to admit the water or steam used as pressure medium to the interior of the handles; secondly, to receive the screw-nut ends to hold them in a central position at regular distances and at right angles with the walls of the handles. The length of these tubes is such as to reach from a given point in one mold-cavity across the channel B to a corresponding point in the mold-cavity opposite, so as to bring the nuts in proper position to receive the tangs of the blades.

The vulcanizing or hardening of the rubber handles is successfully accomplished by the application of the principles and methods specified in Letters Patent No. 178,432, dated June 6, 1876, granted to Charles Grasser; or, if the shape and design of the handles should require it, by means of the application of principles and methods specified in Letters Patent No. 178,479, dated June 6, 1876, granted to myself and Charles Grasser. The first-named method is to be used when metallic molds come in use; the other with plaster-of-paris or porous molds.

After the vulcanizing process is over the handles are removed from the mold, and separated by cutting the connection formed by the channel B. The metal tubes are removed by unscrewing the two handles connected by the tube. The metallic screw-nut remains inside of the handle, its edges being firmly embedded in the walls of the handle, thereby forming a substantial and practical basis to receive the screw-tang of a knife-blade, fork, or other tool.

Having thus described my invention, the following is what I claim as new therein and desire to secure by Letters Patent:

1. A series of handle-molds combined and arranged in the manner and for the purpose specified.

2. The mode of applying the nuts or threaded sockets N by means of screw-threaded tubes F, substantially as herein described.

3. The combination, with the molds, of the nuts N and the perforated tubes F, for casting articles under fluid pressure, substantially as described.

JOHN J. C. SMITH.

Witnesses:
M. SMITH,
ALEX. WOOD.